United States Patent Office 2,754,133
Patented July 10, 1956

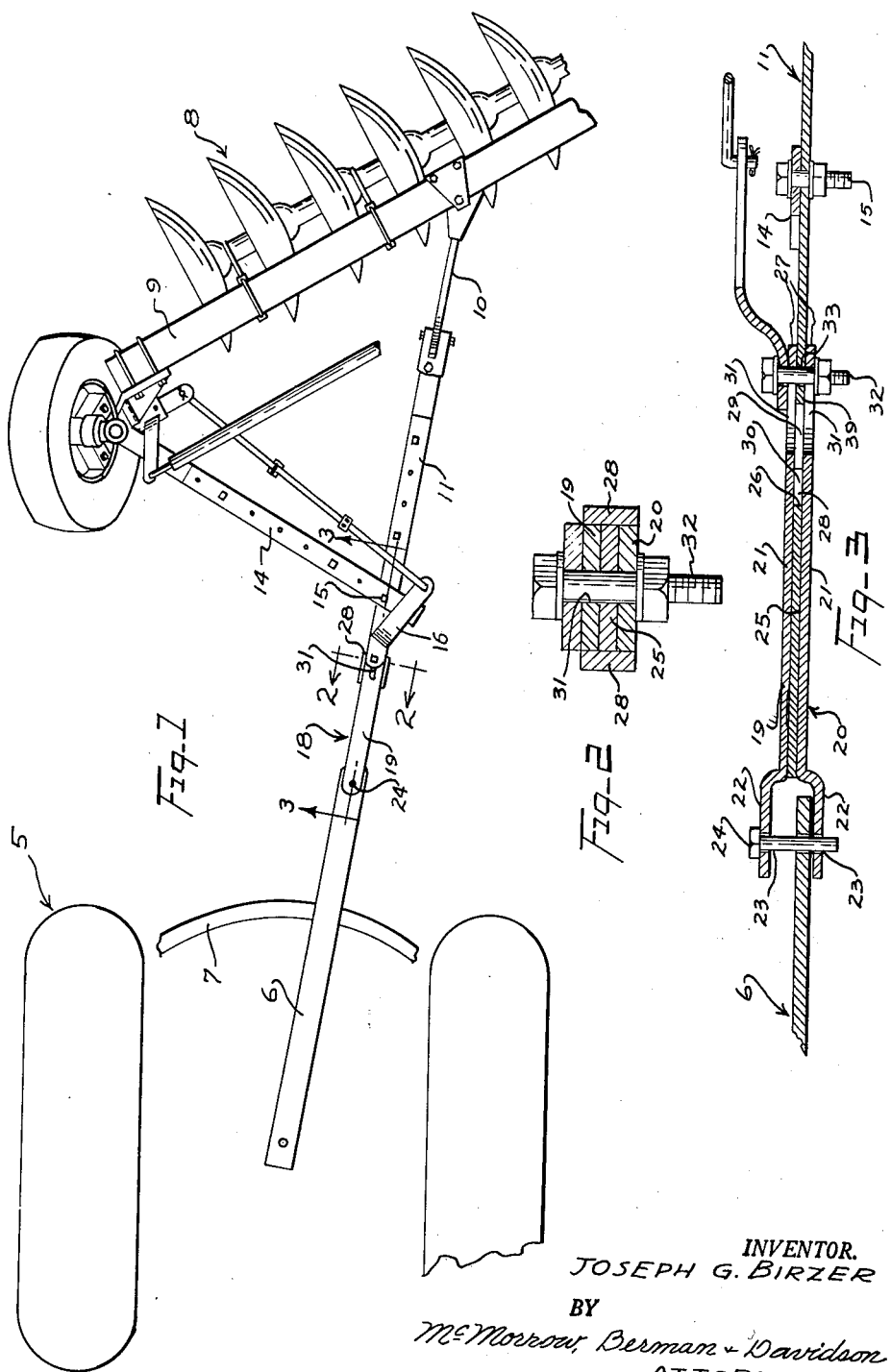

2,754,133
PLOW HITCH
Joseph G. Birzer, Burdett, Kans.

Application August 5, 1952, Serial No. 302,660

1 Claim. (Cl. 280—448)

This invention relates to an improved tractor hitch for plows, and the primary object of the invention is to provide an efficient and reliable hitch of this kind which enables backing up such as a one-way plow of the disk type without danger of driving the plow to either side or bending the hitch or the steering rod thereof.

Other important objects and advantageous features of the invention will be apparent from the following description and the accompanying drawings wherein, for purposes of illustration only, a specific embodiment of the invention is set forth in detail.

In the drawings:

Figure 1 is a fragmentary and schematic plan view showing a hitch in accordance with the present invention connecting a conventional one-way disk plow to a tractor;

Figure 2 is an enlarged transverse vertical section taken on the line 2—2 of Figure 1; and, Figure 3 is an enlarged fragmentary vertical longitudinal section taken on the line 3—3 of Figure 1.

Referring in detail to the drawings, wherein like numerals designate like parts throughout the several views, the numeral 5 generally designates a conventional tractor having a longitudinal hitch or draw bar 6 resting upon an arcuate guide 7, and the numeral 8 generally designates a conventional form of one-way plow, such as a Krause K-3 one-way plow.

The plow 8 includes the transverse frame member 9, the hitch bracket 10 projecting forwardly therefrom and the adjustable drawbar 11 extending forwardly from the bracket 10. The plow 8 includes further the diagonal spreader bar 14, the spreader bar being pivotally connected at 15 to a forward part of the drawbar 11.

In accordance with the present invention the means connecting the tractor drawbar 6 to the plow drawbar 11 comprises the novel hitch generally designated 18. The hitch 18 comprises similar but reversed upper and lower bars 19 and 20, respectively, each comprising a straight plane main portion 21 and a vertically offset forward end portion 22, the end portions 22 being formed with openings 23 which accommodate the hitch pin 24 which traverses the rear end of the tractor drawbar 6, the drawbar 6 being positioned between the end portions 22.

A longitudinal spacer 25 is fixed between the main portions 21 of the bars 19 and 20 and extends from the forward ends of the main portions 21 to a point 26 in forwardly spaced relation to the rear ends 27 of the bars 19 and 20. In the region of the point 26 and extending forwardly and rearwardly relative to the point 26 are locking or abutment plates 28 secured to the spacer 25 and extending along the opposite side edges of the bars 19 and 20. As shown in Figure 3, the parts of the plates 28 which extend rearwardly from the rear end 26 of the spacer 25 form sidewalls of limited length along the opposite sides of the otherwise open space 29 between the rear portions of the bars 19 and 20, and thereby form a socket 30.

The rear end portions of the upper and lower hitch bars 19 and 20 are formed with registered openings 31, 31 receiving the bolt or pin 32, and the forward end of the plow drawbar is disposed between the bars 19 and 20 and is provided with a hole 33 receiving the bolt or pin 32.

Instead of the openings 31, 31 in the hitch bars 19 and 20 being round holes confining the pin 32, and hence the parts connected to the pin 32 to pivotal motion on the axis of the pin 32, the openings 31, 31 are in the form of longitudinally elongated slots. As a result, whenever the tractor 5 is backed up, with a view to backing up the plow 8, the hitch 18 moves rearwardly relative to the pin 32, with the pin 32 sliding in the slots 31, 31, until the pin 32 approaches or reaches the forward ends of the slots 31, 31. This enables the forward end portion 39 of the plow draw bar 11 to enter the socket 30 and thereby become substantially rigidly connected to the hitch bars 19 and 20 so that pivoting of the plow draw bar 11 on the pin 32 is prevented and the plow 8 can be backed straight back without swinging to either side. Once forward motion of the tractor 5 is resumed, the forward end of the plow draw bar 11 comes out of the socket 30 and the pin 32 travels along the slots 31, 31 to the rear ends thereof, and free draft of the plow is resumed.

What is claimed is:

In a hitch for hitching a one-way plow drawbar to a tractor drawbar, two vertically spaced hitch bars having forward ends adapted to be connected to a tractor drawbar and having rear end portions, a spacer fixed between said hitch bars and having a rear end terminating at the forward end of said rear end portions of the hitch bars, plates fixedly mounted along the opposite side edges of the spacer and engaging the opposite side edges of the hitch bars extending rearwardly from the spacer and providing sidewalls along forward parts of said rear end portions of the hitch bars; the hitch bars, the said rear end of the spacer, and said sidewalls forming a socket, said rear end portions of the hitch bars being formed with registered longitudinal slots, and a vertical pin extending through said slots and adapted to traverse the forward end of a plow drawbar whereby upon rearward movement of the tractor the hitch can move rearwardly relative to the pin and the plow drawbar and engage the forward end of the plow drawbar in said socket so as to render the plow drawbar rigid with and in alignment with the hitch bars.

References Cited in the file of this patent

UNITED STATES PATENTS

| 1,094,018 | Rarig | Apr. 21, 1914 |
| 1,568,204 | Blade | Jan. 5, 1926 |
| 1,634,501 | Jackson | July 5, 1927 |
| 1,918,730 | Willson et al. | July 18, 1933 |
| 1,944,674 | Silver | Jan. 23, 1934 |
| 2,378,635 | Hyland | June 19, 1945 |
| 2,435,506 | Morkoski | Feb. 3, 1948 |
| 2,562,747 | Silver et al. | July 31, 1951 |
| 2,628,548 | Ramsey | Feb. 17, 1953 |

FOREIGN PATENTS

| 511,434 | Germany | of 1930 |